United States Patent [19]

Fredrickson et al.

[11] Patent Number: 4,518,225

[45] Date of Patent: May 21, 1985

[54] MULTICOLORED LIQUID CRYSTAL DISPLAYS UTILIZING PHOTOLUMINESCENT TRANSFLECTORS AND MASK

[75] Inventors: Lee R. Fredrickson; Michael R. Cascini; Donald E. Mosier, all of Cedar Rapids, Iowa

[73] Assignee: Rockwell International Corporation, El Segundo, Calif.

[21] Appl. No.: 484,047

[22] Filed: Apr. 11, 1983

[51] Int. Cl.³ .............................................. G02F 1/133
[52] U.S. Cl. ................................... 350/338; 350/339 F
[58] Field of Search ................... 350/331 R, 338, 334, 350/339 F, 345, 350 F

[56] References Cited

U.S. PATENT DOCUMENTS

| | | | |
|---|---|---|---|
| 3,674,338 | 8/1970 | Cartmelle et al. | 350/331 R |
| 3,833,287 | 9/1974 | Taylor et al. | 350/349 |
| 3,840,695 | 10/1974 | Fischer | 350/339 F |
| 4,142,781 | 3/1979 | Baur et al. | 350/350 F |
| 4,167,307 | 9/1979 | Cirkler et al. | 350/345 |
| 4,227,777 | 10/1980 | Murakami | 350/339 F |
| 4,240,711 | 12/1980 | Baur et al. | 350/349 X |
| 4,294,517 | 10/1981 | Jakubek | 350/334 X |

OTHER PUBLICATIONS

*Design Guide: Electroluminescent Lighting*, published by Luminescent Lighting Systems, Inc., Chapt. 2.
Jones et al., "Recent Advances in Dichroic Liquid Crystal Displays for Automotive Applications", Product Catalogue of Electronic Display Systems, Inc., 1981.

*Primary Examiner*—John K. Corbin
*Assistant Examiner*—David Lewis
*Attorney, Agent, or Firm*—Robert C. Mayes; George A. Montanye; H. Fredrick Hamann

[57] ABSTRACT

A brilliant liquid crystal display having the capability of a wide variety of coloration is disclosed utilizing a photoluminescent transflector for concentrating the internal light and ambient light into a narrow frequency range which is coordinated with the dye selected for the liquid crystal, resulting in an enhanced brightness for the display. Masking all regions of the liquid crystal display except for the selectively annunciating segments thereof, the resultant display is capable of a broad range of colors having a significantly enhanced luminance characteristic.

6 Claims, 3 Drawing Figures

MULTICOLORED LIQUID CRYSTAL DISPLAYS UTILIZING PHOTOLUMINESCENT TRANSFLECTORS AND MASK

BACKGROUND OF THE INVENTION

This invention relates to electronics in general and to liquid crystal displays in particular. More particularly, this invention relates to a brilliant liquid crystal display having the capability of a wide variety of coloration and having an improved contrast ratio.

The advent of liquid crystal display technology has resulted in a wide variety of uses for both digital displays (as in, for example, calculator and digital watch displays), and analog representations (such as are utilized in analog liquid crystal display watches, automotive speedometers, and engine indicators, as well as other applications). Polarized light is used by twisted nematic liquid crystal displays to create light and dark regions of the display, however the absorption of light by the polarizers results in reduced light output.

Dichroic liquid crystal displays or "guest-host" liquid crystal displays utilize dichroic dyes that are in solution with a host liquid crystal. When activated, the liquid crystal host is capable of reorienting the molecules of the dye such that the dyes are essentially nonabsorbing to light entering perpendicular to the surface of the crystal. When the crystal is deactivated, the dye effectively absorbs the incident light. A detailed technical paper entitled "Recent Advances in Dichroic Liquid Crystal Displays for Automotive Applications" by D. Jones and B. Desa was published in the 1981 product catalog of Electronic Display Systems, Inc. and is useful in explaining the operation and principles of dichroic liquid crystal display operation. That technical article is hereby incorporated by reference thereto. That article states that "the colors in the displays shown in FIG. 3 [of the article] are simply the result of silk screening the various pigments onto the back glass". It is suggested, however, that the use of absorptive coloration filters in a liquid crystal display requires increased lighting levels to maintain a desired level of brightness for the display, and alternative methods of coloration are therefore preferable when possible.

Many liquid crystal displays utilize various forms of electroluminescent lighting as an internal light source for dim ambient lighting conditions to enhance the readability of the displays. The book entitled *Design Guide: Electroluminescent Lighting*, published by Luminescent Lighting Systems, Inc., provides a useful background resource. Chapter 2 is particularly applicable, and is incorporated herein by reference. In paragraph 2.3, page 13 of the incorporated chapter, it is taught that an electroluminescent light, utilized as a common emissive display, may be utilized with a photoluminescent dye or overlay and that absorptive filtering such as utilizing common colored filters should be avoided if possible.

SUMMARY AND BRIEF DESCRIPTION OF THE INVENTION

Accordingly, it is an object of the present invention to provide a liquid crystal display apparatus having an improved luminescence characteristic.

Another object of the present invention is to provide a liquid crystal display having an improved contrast between the light and dark regions thereof.

A liquid crystal display is constructed in accordance with the present invention wherein a display having a viewing surface and a segmented annunciation configuration on a first region thereof, additionally has a second, light attenuation region, an opaque mask disposed in a proximal parallel relationship to the crystal and positioned relative to the surface opposite the viewing surface for enhancing light attenuation in the second region, and a photoluminescent material disposed in a cooperative configuration with the first region for concentrating luminescence in a predetermined frequency range in forming a viewing pattern as a function of the segmented annunciation configuration.

The mask may comprise in one embodiment a layer of paint having a substantial absorption characteristic wherein the paint layer coincides substantially with the second, light attenuation region, or dark region of the display, and in an alternative embodiment, a mask is formed of a discrete sheet of dark material matching essentially the dark regions of the display. In either case the mask is specifically not related to the segmented portions of the display utilized for selective annunciation. This structure enables complete blockage of the light from the rear of a crystal to the viewing surface in those regions of the crystal which are not utilized for annunciation.

In the annunciation regions, a photoluminescent material is provided and in one embodiment comprises a layer of paint having a substantial light-activated luminescent characteristic and which is formed on the surface opposite the viewing surface of the liquid crystal display, and operates in cooperation with the annunciation region thereof.

Additionally, a means for illumination of the photoluminescent material is positioned adjacent to the transflector to provide a source of light to activate the luminescent characteristic of the photoluminescent material. A transflector as used in this specification is a relatively thin sheet of material having both the capability of diffusing light received from one side and retransmitting it through the material to the second side and having the capability of reflecting light received from the second side back toward the source of emission. It is a contraction of the words transmitter and reflector and has become a common descriptive term in the backlit liquid crystal display art. In one embodiment, the electroluminescent light source is matched to the light absorption characteristic of the liquid crystal display and additionally to the photoluminescent material such that an enhanced contrast and brilliant display results.

The novel features believed to be characteristic of this invention are set forth in the appended claims. The invention itself, however, as well as other objects and advantages thereof, may best be understood by reference to the following detailed description of illustrative embodiments when read in conjunction with the accompanying drawings in which:

DETAILED DESCRIPTION OF THE DRAWINGS

Figure 1A:
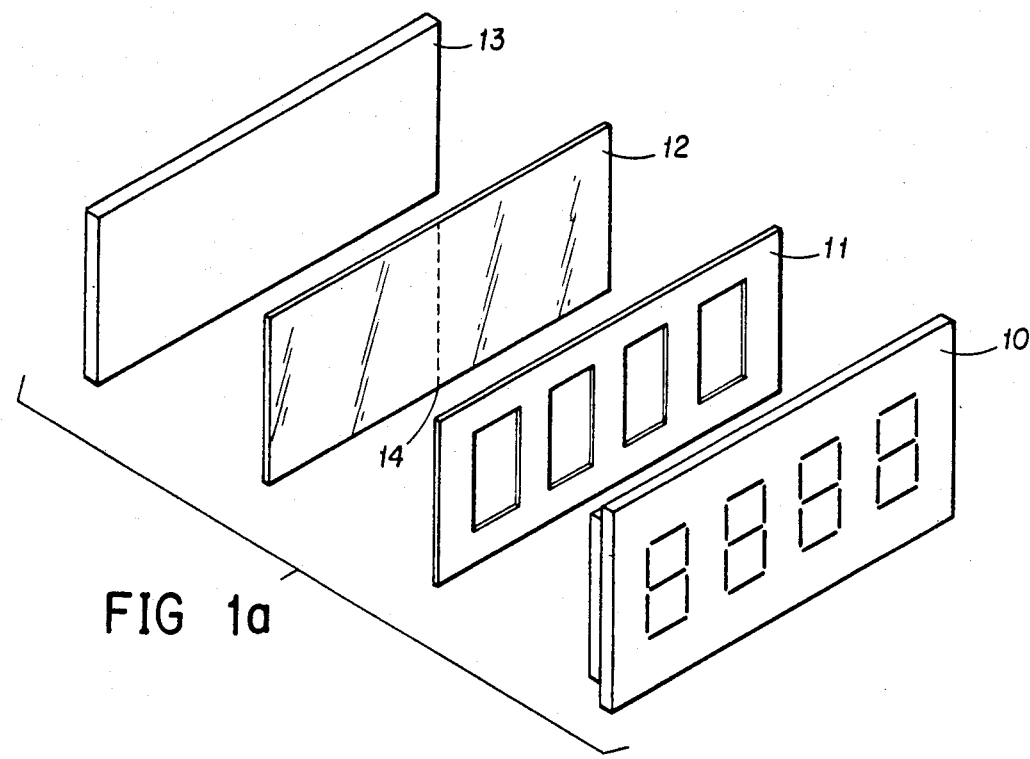
FIG. 1a is a perspective exploded view of one embodiment of the present invention showing the relative components of the display assembly in their proper relationships.

Referring now to FIG. 1a, an exploded perspective view of a liquid crystal display constructed in accordance with the present invention is shown wherein liquid crystal 10 is a standard commercially available liquid crystal display, such as one manufactured by Electronic Display Systems, Inc., which has a plurality of seven-segment numeric readouts. Mask 11 is formed in one embodiment of a beryllium copper plate having a thickness on the order of 0.01 cm and having been painted with a flat black paint. The openings in mask 11 are matched to the display areas of the crystal 10 such that light normally blocked by the regions of the display which are not utilized for annunciation is completely blocked from the rear by mask 11. Additionally, light entering the front of the display is also substantially absorbed by the mask when striking the areas surrounding the annunciation region. Transflector 12 is formed of a sheet of melamine resin, which is a commercially-available industrial plastic, and has a thickness on the order of 0.0025 cm, to which a layer of photoluminescent paint has been applied on the front surface. Other thin, white, translucent materials are also useful as transflectors and are used in alternative embodiments. Optionally, in different embodiments, transflector 12 may be formed by applying a first fluorescent colored paint or material to one side of a line (for example, line 14 of FIG. 1a) and a second colored paint or material on the other side of the line. This will provide for displays having different colors in various areas while utilizing the same liquid crystal.

The adherence of the photoluminescent paint is improved by first applying a thin layer of transparent polyurethane paint to the surface of the resin and allowing it to dry.

The electroluminescent lighting panel 13 provides a backlighting capability to the assembly and is selected such that the excitation frequency of the electroluminescent phosphors is such that the photoluminescent phosphors on the transflector 12 are readily excited to luminesce when activated by lighting panel 13. By utilizing a bluish green electroluminescent panel having a spectral peak emissivity between 450 and 520 nanometers wavelength, the photoluminescent paint selected may be generally any color having a wavelength longer than 520 nanometers and retain the full benefit of the combination. Oranges, yellows and reds were observed to operate extremely well utilizing the described lighting panel and liquid crystal display. It should also be noted that the liquid crystal display used has a slight bluish cast, resulting from the dye in the crystal increasingly attenuating the shorter light wavelengths. The described combination thus causes the conversion of the light from the spectral peak emission in the bluish to blue-green range of between 450 and 520 nanometers, to a longer light wavelength defined by the color of the photoluminescent transflector. This provides for optimum brilliance as viewed from the front of the display. Since the shorter light wavelengths are increasingly attenuated by the crystal, yellow, orange, and red transflector colors were found to provide optimum brilliance in this exemplary embodiment.

It should also be noted that the non-annunciating portions of each of the numerical displays contained within the numerals may also be masked in other embodiments, however, the readability of the display is reduced and the mask therefore should not precisely outline the segments of the crystal.

Figure 1B:
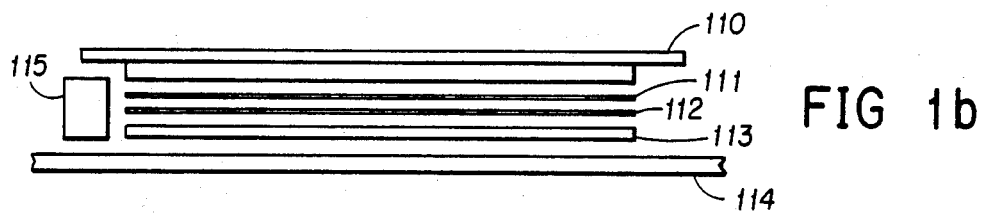
FIG. 1b is a side view of the embodiment of the invention shown in FIG. 1a additionally showing elements used for mounting and for electrical interconnection.

Referring now to FIG. 1b, a side view of a liquid crystal display is shown having a slightly exploded representation for clarity. In actual construction, the liquid crystal display 110 has a plurality of metallic contacts along the outside edges of the crystal, and by providing an elastomeric connector 115 having a striated conduction capability, the crystal is directly mounted onto the printed circuit board 114. Other methods of mounting are known in the art, such as gluing the contacts directly to a flexible circuit board with conductive epoxy.

Mask 111 is disposed between transflector 112 and liquid crystal 110 so that light from the electroluminescent panel 113 is blocked in all regions of the display except for the annunciation regions.

Figure 2:
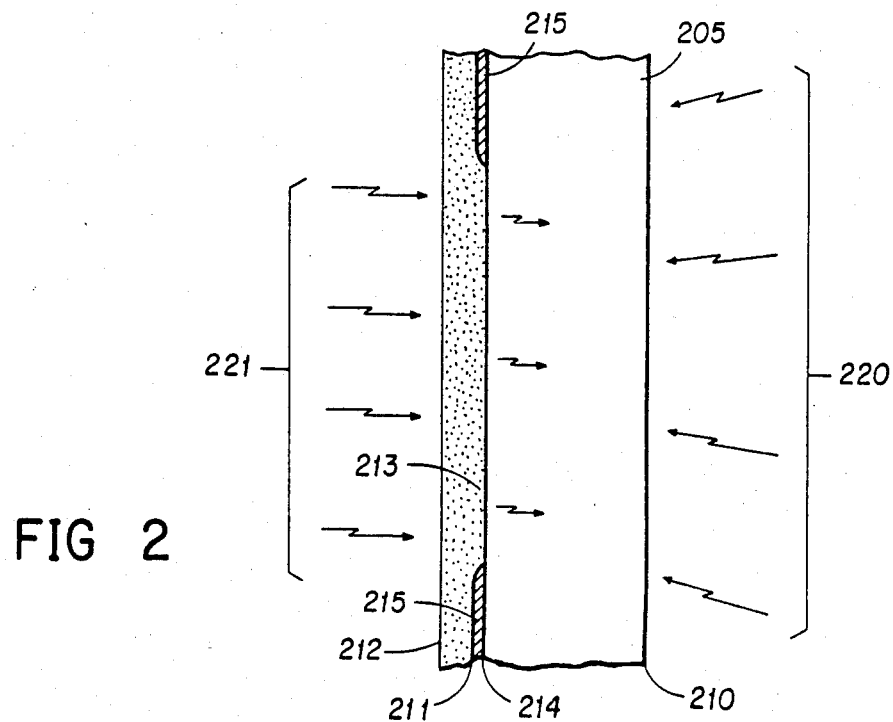
FIG. 2 is a cross sectional view of an alternative embodiment wherein the back glass of a liquid crystal display constructed in accordance with the present invention utilizes painted layers to obtain the benefits of the invention.

Referring now to FIG. 2, a cross-sectional view of a back glass portion of a liquid crystal display is shown wherein the glass 205 receives light 220 from the front of the display and additionally receives light 221 from the backlit light source (not shown). The glass 205 has a first patterned layer of opaque paint 215 silk screened directly on the surface of the glass 214 and corresponds to those regions of the liquid crystal that are not used for annunciation. Additionally, a layer of photoluminescent paint 213 is applied to the surface of the glass and over the opaque masking regions 211 such that light rays 220 entering from the front of the LCD are capable of exciting the photoluminescent characteristic of the paint in those regions exposed to the light. Additionally, the light source providing backlit rays 221 also provides for excitation of the photoluminescent characteristic of the paint. By allowing the photoluminescent area to extend beyond the masked region as shown at 212, the photoluminescent activity of the paint resulting from backlit rays 221 is enhanced by providing a larger backlit light collection area for the display. A transflector (not shown) is also utilized to provide a transmitting-reflecting surface between the photoluminescent paint 212 and the source of light rays 221. The transflector in one embodiment may comprise an additional layer of white paint over the surface of photoluminescent paint 212 or alternatively may comprise a separate transflector as shown in FIG. 1b.

An important aspect of the present invention is realized by utilizing the frequency concentration aspect of the photoluminescent coloration in the assembly which allows the full light energy capability of the backlight source to be utilized. Additionally, the selection of electroluminescent phosphors when coordinated with the selection of appropriate photoluminescent characteristics of the transflector, allows for a significantly enhanced brilliance aspect. Furthermore, when coordinated with a liquid crystal display having a known attenuation characteristic, this benefit can be further enhanced.

In a preferred embodiment, the liquid crystal utilizes a reddish dye which normally appears totally black to the unaided eye. When combined with a blue-white electroluminescent display having spectral peak emissions with a first peak between 450 and 520 nanometers and a second peak between 550 and 600 nanometers wavelength, virtually all colors of photoluminescent active material may be utilized to good effect.

Various colors may be obtained by mixing photoluminescent paint in proper proportions to obtain spectral emission characteristics which appear to the human eye to have a single color. For example, utilizing standard fluorescent paints manufactured by Day-Glo Corporation, an approximately 6 cl mixture comprising two parts signal green paint and one part aurora pink paint were combined together with one drop each of lightning yellow and arc yellow flourescent paints to obtain a brilliant photoluminescent brown color when perceived by the human eye. Thus it can be seen that by coordinating the emission characteristics of the electroluminescent panel (or other light source) with the photoluminescent transflector and considering the attenuation characteristics of the liquid crystal display, a brilliant display having an enhanced luminescence characteristic is readily obtained.

A particularly important benefit of the present invention is the capability to specifically tailor liquid crystal displays to particular environments. For example, it is known that the ambient light shifts as a function of altitude from normal white sunlight at sea level to a bluer light having a greater component of shorter wavelength light waves at high altitude. This fact can be utilized together with the present invention to provide a highly readable aircraft display system with visibility enhanced in the normal operating environment of the aircraft. This is done by utilizing a liquid crystal display having an enhanced blue light attenuation characteristic in darkened portions of the crystal in cooperation with a photoluminescent transflector as described herein to increase the brilliance of the annunciated segments. Alternatively, a liquid crystal having an enhanced red attenuation characteristic in darkened regions thereof may be utilized in the same environment in cooperation with the opaque mask and the photoluminescent transflector to substantially increase the light output from the display resulting from ambient light. The red crystal (appearing essentially black to the human eye) will provide enhanced blue and green display emission since the reddish crystal will attenuate those light wavelengths to a much lesser extent than a crystal formed utilizing a bluish dye.

While this invention has been described with reference to various illustrative embodiments, it is not intended that this description be construed in a limiting sense. Various modifications of the illustrative embodiments as well as other embodiments of the invention will be apparent to persons skilled in the art upon reference to this description. It is therefore contemplated that the appended claims will cover any such modifications of embodiments as fall within the true scope of the invention.

What is claimed is:

1. A liquid crystal display for an aircraft having a segmented display configuration in a first region having a segmented readout and having a second region comprising in combination:
   a. a liquid crystal material having a dye with blue light attenuation characteristics in darkened portions thereof;
   b. a photoluminescent transflector disposed in a spaced parallel relationship with said liquid crystal material;
   c. a mask disposed interjacent said liquid crystal material and said transflector, forming a spacing means therein, and having a configuration conforming substantially with said second region of said display; and
   d. a light source disposed on a side opposite said mask, whereby said liquid crystal material, said photoluminescent transflector, and said light source have coordinated emission characteristics.

2. A display as in claim 1 wherein said transflector has a spectral peak emission between 540 and 650 nanometers.

3. A liquid crystal display as in claim 1 further comprising an electroluminescent light source having a spectral emission characteristic with a first peak between 450 and 520 nanometers, and a second peak between 550 and 600 nanometers.

4. A liquid crystal display for an aircraft having a segmented display configuration in a first region having a segmented readout and having a second region comprising in combination:
   a. a liquid crystal material having a dye with red light attenuation characteristics in darkened portions thereof;
   b. a photoluminescent transflector disposed in a spaced parallel relationship with said liquid crystal material;
   c. a mask disposed interjacent said liquid crystal material and said transflector, forming a spacing means therein, and having a configuration conforming substantially with said second region of said display; and
   d. a light source disposed on a side opposite said photoluminescent transflector, whereby said liquid crystal material, said photoluminescent transflector, and said light source have coordinated emission characteristics.

5. A display as in claim 4 wherein said transflector has a spectral peak emission between 400 and 525 nanometers.

6. A liquid crystal display as in claim 4 further comprising an electroluminescent light source having a spectral emission characteristic with a first peak between 450 and 520 nanometers, and a second peak between 550 and 600 nanometers.

* * * * *